United States Patent
Milosevski et al.

(10) Patent No.: US 9,420,170 B2
(45) Date of Patent: Aug. 16, 2016

(54) GRAPHICAL USER INTERFACE FOR VIDEO RECORDING DEVICE

(71) Applicant: NXP B.V., Eindhoven (NL)

(72) Inventors: Vlatko Milosevski, Eindhoven (NL); Nicolas Sauvage, Kaohsiung (TW)

(73) Assignee: NXP B.V., Eindhoven (NL)

( * ) Notice: Subject to any disclaimer, the term of this patent is extended or adjusted under 35 U.S.C. 154(b) by 314 days.

(21) Appl. No.: 14/143,152

(22) Filed: Dec. 30, 2013

(65) Prior Publication Data

US 2015/0189165 A1    Jul. 2, 2015

(51) Int. Cl.
*H04N 5/775*    (2006.01)
*H04N 5/232*    (2006.01)
*H04N 5/77*    (2006.01)
*G11B 31/00*    (2006.01)
*G11B 27/34*    (2006.01)

(52) U.S. Cl.
CPC ............ *H04N 5/23222* (2013.01); *G11B 27/34* (2013.01); *G11B 31/006* (2013.01); *H04N 5/23258* (2013.01); *H04N 5/23293* (2013.01); *H04N 5/772* (2013.01)

(58) Field of Classification Search
CPC ....... H04N 5/775; H04N 5/85; H04N 9/8042; G11B 27/34; G11B 27/105
USPC .......................................................... 386/230
See application file for complete search history.

(56) References Cited

U.S. PATENT DOCUMENTS

| | | | |
|---|---|---|---|
| 6,476,861 B1 * | 11/2002 | Min | H04N 5/23293 348/208.15 |
| 8,830,339 B2 * | 9/2014 | Velarde | H04N 5/232 348/208.16 |
| 2008/0180537 A1 * | 7/2008 | Weinberg | H04N 5/2256 348/211.99 |
| 2009/0262074 A1 | 10/2009 | Nasiri et al. | |
| 2011/0142414 A1 | 6/2011 | Lee | |
| 2013/0148914 A1 | 6/2013 | Blasczak et al. | |

FOREIGN PATENT DOCUMENTS

| | | |
|---|---|---|
| EP | 0 509 208 A2 | 10/1992 |
| EP | 1 094 383 A2 | 4/2001 |
| EP | 2 388 735 A2 | 11/2011 |

OTHER PUBLICATIONS

Extended European Search Report for EP Patent Appln. No. 14199185.1 (Mar. 18, 2015).

* cited by examiner

*Primary Examiner* — William C Vaughn, Jr.
*Assistant Examiner* — Daniel Tekle
(74) *Attorney, Agent, or Firm* — Rajeev Madnawat

(57) ABSTRACT

A computer-implemented method for assisting in recording video content on a video recording device. The method involves displaying a cross which comprises two orthogonal intersecting lines, displaying an indicator token, and changing the state of at least one of the cross and the indicator token in response to a control signal from the video recording device to provide visual notification to a user of the video recording device.

16 Claims, 4 Drawing Sheets

GRAPHICAL USER INTERFACE FOR VIDEO RECORDING DEVICE

CROSS-REFERENCE TO RELATED APPLICATION

This application is related to the application entitled "METHOD FOR VIDEO RECORDING AND EDITING ASSISTANT," filed Dec. 30, 2013, having application number 13290331.1.

BACKGROUND

The use of portable devices that can record video has increased significantly in recent years. As a result, more users are recording video content. Often, recorded video content suffers from operational error, which can result in poor visual and/or audio quality. For example, operational error might include skewing the orientation of or shaking the portable device, panning across or zooming in or out of a scene too quickly, recording with ineffective lighting, or blocking the camera lens or microphone while recording.

In response to such operational errors, camera technology has begun to incorporate additional features to help guide a user during recording to minimize the effect of errors. However, cumbersome graphic user interfaces (GUIs) can render the additional features useless or underappreciated if the features are too difficult to use. Camera manufacturers have found that simple and intuitive interfaces help facilitate use of the additional features and often translate to market success. Despite camera manufacturers' common goal of providing simplistic and intuitive interfaces, the market still includes many different types of user interfaces. For example, user interfaces include touch interfaces, sensor-driven interaction interfaces, speech command interfaces, and eye-tracking command interfaces. Some user interfaces are easier to use than others and, as such, have been widely adopted. For example, in the area of video capture, "pinch-to-zoom" and "face-tracking" interfaces have been widely adopted. However, these interfaces are limited to a single function (e.g., zooming the image or tracking faces) and therefore may not help to address the variety of operational errors that can occur during video recording.

SUMMARY

In an embodiment in accordance with the invention, a computer-implemented method for assisting a user in recording video content on a video recording device involves displaying a cross having two orthogonal intersecting lines and displaying an indicator token. The state of the cross and/or indicator token change in response to a control signal from the video recording device to provide visual notification to a user of the video recording device.

In another embodiment, a system includes a display device and a processor that is configured to execute instructions to display a graphical user interface on a video viewfinder of a video recording device. The graphical user interface, which helps assists the user in recording video content, includes a cross having two orthogonal intersecting lines and an indicator token. The cross and indicator token assume various states in response to a control signal from the video recording device to provide visual notification to a user of the video recording device.

In another embodiment, a non-transitory computer-readable storage medium includes instructions that, when executed in a video recording device, enable a graphical user interface to be displayed. The graphical user interface, which helps assist the user in recording video content, includes a cross having two orthogonal intersecting lines and an indicator token. The cross and indicator token assume various states in response to a control signal from the video recording device to provide visual notification to a user of the video recording device.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1A:
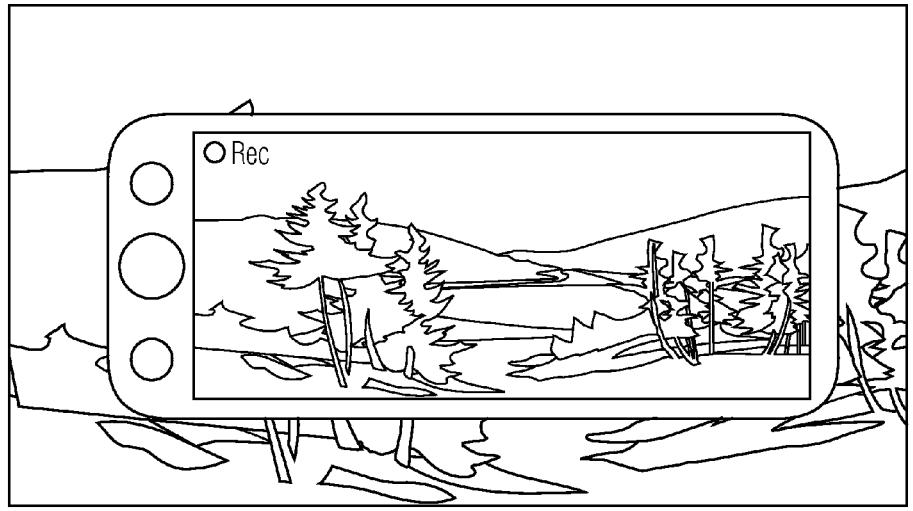
FIG. 1A is an illustration of a viewfinder of a video recording device known in the prior art.

FIG. 1A illustrates a video recording device as known in the art. The video recording device is typically a portable, hand-held, or mobile device that has an image sensor or camera which captures images and displays the images on a video viewfinder in real-time. Typically, the video recording device has a touch or physical button interface to allow a user to start or stop the recording of images captured by the image sensor or camera. While recording, the video viewfinder will typically display an indicator to inform the user that the video recording device is recording. The video viewfinder may also display other information about the video recording device such as, for example, the length of the video content recording, available memory on the video recording device, the battery level of the video recording device, or current zoom distance along a spectrum of possible zoom distances.

Additionally, the video recording device of FIG. 1A has one or more sensors (e.g., a light sensor, accelerometer, gyroscope, and microphone) that allow the video recording device to detect stimuli such as light, movement, orientation, and/or sound. When using the video recording device, a user typically aims the video recording device at a scene and attempts to keep the device aimed at the scene without the use of additional anchoring or support. In FIG. 1A, a video recording device is shown in a horizontal (e.g., landscape) orientation aimed at an outdoor scene and a captured image of the outdoor scene is displayed on the video viewfinder. Once recording is started, the video viewfinder also displays an indicator that the video recording device is recording.

In the course of recording video content, a user can introduce operational error by, for example, aiming the video recording device toward the sun or moving the video recording device too quickly or at an undesired angle. Operational error may go unnoticed by the user during recording, which can degrade the quality of the recorded video, but, by making the user mindful of the occurrence of operational errors, the errors can be timely corrected and video quality improved.

Figure 1B:
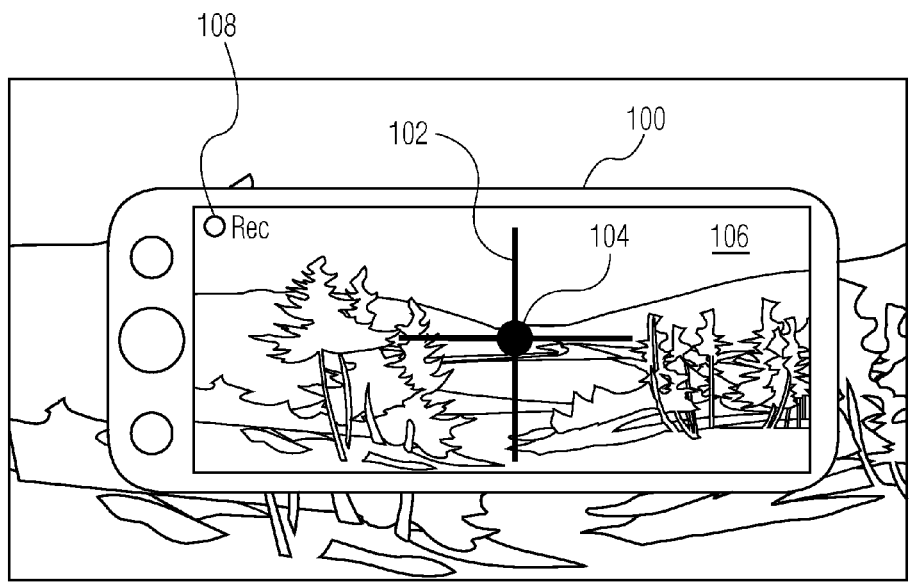
FIG. 1B is an illustration of the viewfinder of FIG. 1A overlaid with a cross and indicator token in accordance with an embodiment of the invention.

In an embodiment in accordance with the invention, a GUI is provided for use with a recording device. The GUI includes a cross and an indicator token to provide visual notification to a user of the video recording device. FIG. 1B illustrates a cross 102 and indicator token 104 that are displayed, in addition to an indicator that the video device is recording 108, on the video viewfinder 106 of a video recording device 100 to provide visual notification to a user of the video recording device. The cross and indicator token can assume various states to provide visual notification to the user in response to signals that have been processed by, for example, a video recording assistant system that is running on the video recording device. In an embodiment, the signals are generated in response to outputs from on-device sensors that can detect, for example, direction of movement, degree of movement, light balance, rate of zoom, or device orientation. In an embodiment, the cross and indicator token change state by, for example, moving about the video viewfinder, changing shape, changing size, and/or changing color to provide visual notification to the user. For example, the cross may rotate in order to provide visual notification about the orientation of the video recording device, the indicator token may move about the cross, similar to a point in a Cartesian coordinate plane, to provide notification about the direction and/or degree of movement, or the indicator token may change size and/or color to provide notification to the user about the quality of the recording. The cross and indicator token can also be configured in multiple states at one time. For example, the indicator token can drift in a direction related to the inertia experienced by the video recording device while bouncing up and down on the cross. In the embodiment of FIG. 1B, the cross and indicator token are centrally located in the video viewfinder, but in other embodiments, the cross and indicator token can be in a different location within the video viewfinder. Additionally, although the cross and indicator token are shown as being a particular size relative to the video viewfinder, the sizes of the cross and indicator token could be different from that shown. For example, the sizes of the cross and indicator token relative to the video viewfinder could be different from what is shown and/or the sizes of the cross and indicator token relative to each other could be different from what is shown.

In an embodiment, the cross 102 and indicator token 104 are configured to occupy a limited area of the video viewfinder 106 so as to block very little of the displayed image.

The various states of the cross and indicator token are minimally intrusive so as to limit distracting the user from the scene being recorded.

The various states of the cross 102 and indicator token 104 configuration are changed in response to control signals from the video recording device 100. If the video recording device is running a video recording assistant system, then, when the video recording assistant system receives and processes video input from the image sensor or other sensors, the video recording assistant system may output a GUI control signal that causes the cross and indicator token to assume a state that corresponds to the GUI control signal. For example, a video recording assistant system running on a shaking video recording device that is recording receives input from the accelerometer sensor, processes the input, and outputs a GUI control signal that causes the cross and indicator token to change state so that the indicator token bounces up and down on the cross.

Figure 2A:
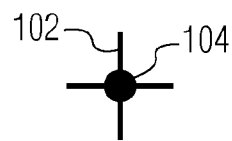
FIG. 2A is an illustration of the cross and indicator token in a state that provides notification relating to the video recording device in accordance with an embodiment of the invention.

FIGS. 2A-2L depict examples of different states assumed by the cross 102 and indicator token 104 to provide various visual notifications to a user of a video recording device. FIG. 2A depicts an embodiment of the cross 102 and indicator token 104 in a state that is configured to provide visual notification that the video recording device is in the optimal condition to record. In an embodiment, the cross is formed by two orthogonal lines and the indicator token is a circle located at the intersection of the two lines. When the cross and indicator token are in the state shown in FIG. 2A, the user is encouraged to maintain the state of the cross and indicator token while recording.

Figure 2B:
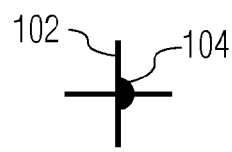
FIG. 2B is an illustration of the cross and indicator token in a state that provides notification relating to camera or microphone blockage in accordance with an embodiment of the invention.

FIG. 2B depicts an embodiment of the cross 102 and indicator token 104 in a state that is configured to provide visual notification that the camera or microphone is blocked. As shown in FIG. 2B, the indicator token changes shape to a semicircle and remains in this state until the blockage is corrected. In an alternative embodiment, a text message can also be displayed to clarify what has been blocked. Through the state change shown in FIG. 2B, the user is encouraged to resolve the blockage issue.

Figure 2C:
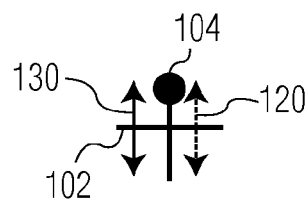
FIG. 2C is an illustration of the cross and indicator token in a state that provides notification relating to focus or image stability in accordance with an embodiment of the invention.

FIG. 2C depicts an embodiment of the cross 102 and indicator token 104 in a state that is configured to provide visual notification that the video recording device is vertically shaking. As shown in FIG. 2C, the indicator token is a circle positioned on the cross. The dotted arrows 120 indicate the animation of the indicator token and the solid arrows 130 indicates the movement of the video recording device. When the video recording device is shaking, the indicator token moves up and down with respect to the cross and in sync with the intensity of the shaking in a manner similar to a bouncing ball. In an embodiment, the indicator token continues to move up and down until the user stabilizes the video recording device. Through the state change shown in FIG. 2C, the user is encouraged to stabilize the video recording device.

Figure 2D:
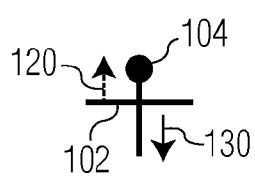
FIG. 2D is an illustration of the cross and indicator token in a state that provides notification relating to the video recorder being lowered too quickly before video recording is stopped in accordance with an embodiment of the invention.

FIG. 2D depicts an embodiment of the cross 102 and indicator token 104 in a state that is configured to provide visual notification that the video recording device is being lowered too quickly while video content is being recorded. The dotted arrow 120 in FIG. 2D indicates the animation of the indicator token on the cross while the solid arrow 130 indicates the movement of the video recording device. For example, if a user drops his hand in the direction of the solid arrow prior to ending recording of the video content, then the indicator token will rapidly rise along the cross in the direction of the dotted arrow. Through the state change shown in FIG. 2D, the user is encouraged to return the video recording device to the position it was in before being lowered (e.g., a position where the indicator token is centered on the cross) while recording.

Figure 2E:
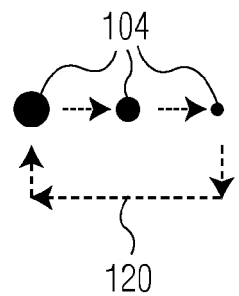
FIG. 2E is an illustration of the cross and indicator token in states assumed over time to provide notification relating to repetitive animation in the video recording in accordance with an embodiment of the invention.

FIG. 2E depicts an embodiment of the indicator token 104 in a time series of states that are configured to provide visual notification that the recorded scene is too static (e.g., no motion or changes) over a period of recording time. In FIG. 2E, a first, second, and third circle (from left to right) are shown connected by dotted arrows 120 and each circle represents a state of the indicator token over time while the dotted arrows indicate the progression through the various states. For example, if the scene remains static, then the indicator token simulates deflating as it changes from the first to the second and finally the third circle, but returns to the size of the first circle when more motion or changes occur in the recorded scene. While not shown for simplicity, the indicator token is centered on the cross in each state shown in FIG. 2E. Through the state changes shown in FIG. 2E, the user is encouraged to stop the recording or introduce more motion or change into the scene.

Figure 2F:
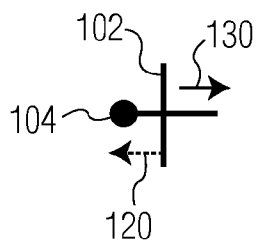
FIG. 2F is an illustration of the cross and indicator token in a state that provides notification relating to horizontal panning speed in accordance with an embodiment of the invention.

FIG. 2F depicts an embodiment of the cross 102 and indicator token 104 in a state that is configured to provide visual notification that the video recording device is moving horizontally (e.g., right or left) too quickly. When the video recording device is moved horizontally too quickly, the indicator token will move in the opposite direction of the video recording device at a rate related to the inertia experienced by the video recording device. In FIG. 2F, the dotted arrow 120 indicates the animation of the indicator token while the solid arrow 130 indicates the movement of the video recording device. For example, if the video recording device is moved too quickly to the right, then the cross will move with the video recording device, but the indicator token will trail to the left behind the vertical line of the cross. If the video recording device is moved at an acceptable rate, then the indicator token will move in the same direction as the video recording device. Through the state change shown in FIG. 2F, the user is encouraged to move the video recording device at a slow enough rate that the indicator token will remain in the same state as shown in FIG. 2A.

Figure 2G:
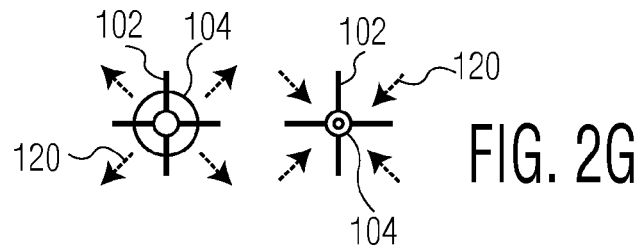
FIG. 2G is an illustration of the cross and indicator token in a state that provides notification relating to zooming speed in accordance with an embodiment of the invention.

FIG. 2G depicts an embodiment of the cross 102 and indicator token 104 in states over time that are configured to provide visual notification that the video recording device is zoomed in or out too quickly. If the video recording device is zoomed in too quickly, then the indicator token will expand as indicated in the left-side example. Alternatively, if the video recording device is zoomed out too quickly, then the indicator token will shrink as indicated in the right-side example. In the left-side example, the larger circle and outward dotted arrows 120 around the indicator token indicate the expanding animation displayed when the video recording device is zoomed in too quickly and, in the right-side example, the smaller circle and inward dotted arrows 120 around the indicator token indicate the shrinking animation displayed when the video recording device is zoomed out too quickly. Through the state changes shown in FIG. 2G, the user is encouraged to maintain a zoom speed such that the cross and indicator token remain in the same state as shown in FIG. 2A.

Figure 2H:
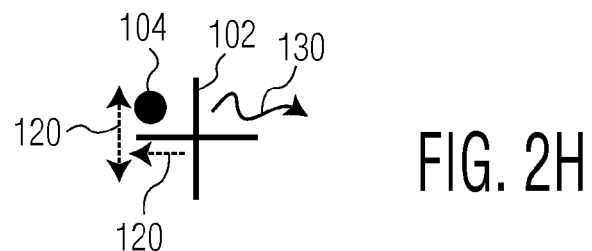
FIG. 2H is an illustration of the cross and indicator token in a state that provides notification relating to horizontal panning in accordance with an embodiment of the invention.

FIG. 2H depicts an embodiment of the cross 102 and indicator token 104 in a state configured to provide visual notification that the video recording device is shaking and panning too quickly at the same time. The embodiment of FIG. 2H combines features shown in FIG. 2C and FIG. 2F. In an embodiment, the cross and indicator token animate and the indicator token moves a distance and at a rate that are relative to the inertia experienced by the video recording device. Additionally, the indicator token bounces up and down along the cross in sync with the shaking of the video recording device. The dotted arrows 120 indicate the animation of the indicator token while the solid arrow 130 indicates the movement of the video recording device. The combination of the two features encourages the user to stabilize the video recording device while horizontally panning. For example, if the user pans the video recording device too quickly to the right while shaking the device, as indicated by the solid arrow, the indicator token will trail left of the vertical line of the cross and bounce up and down relative to the cross. Through the state changes shown in FIG. 2H, the user is encouraged to pan more slowly and stabilize the video recording device in order to return the cross and indicator token to the state depicted in FIG. 2A.

Figure 2I:
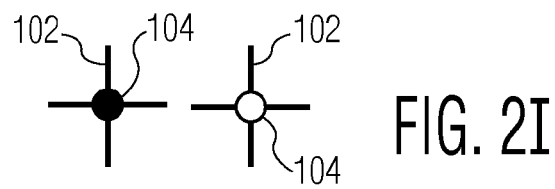
FIG. 2I is an illustration of the cross and indicator token in a state that provides notification relating to light balance in accordance with an embodiment of the invention.

FIG. 2I depicts an embodiment of the cross 102 and indicator token 104 in states that are configured to provide visual notification that a recorded scene is either too dark or too bright. In the embodiment of FIG. 2I, if a scene is too dark, then the indicator token will darken (e.g., change to a darker color or darker shade of gray) and if the scene is too bright, then the indicator token will lighten (e.g., change to a lighter color or lighter shade of gray). FIG. 2I shows the cross and indicator token on the left with the indicator token colored black to indicate darkening of the indicator token to notify the user that the scene is too dark and the cross and indicator token on the right with the indicator token colored white to indicate lightening of the indicator token to notify the user that the scene is too bright. Once the scene lighting is corrected, the indicator token returns to normal coloration. For example, referring back to FIG. 1B, the indicator token may darken if the video recording device is aimed at a scene in the shade and may lighten if aimed toward the sky, but will return to normal coloration when aimed back across the entire landscape. Through the state changes shown in FIG. 2I, the user is encouraged to reposition the video recording device to allow more or less light to reach the image sensor accordingly.

Figure 2J:
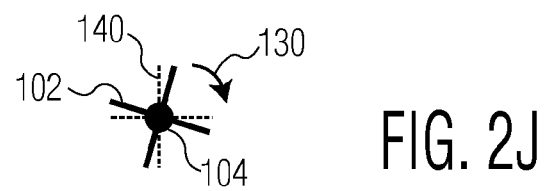
FIG. 2J is an illustration of the cross and indicator token in a state that provides notification relating to orientation of the video recording device in accordance with an embodiment of the invention.

FIG. 2J depicts an embodiment of the cross 102 and indicator token 104 in a state that is configured to provide visual notification that the video recording device is held at a skewed orientation. The dotted cross 140 indicates the normal orientation of the cross and the solid arrow 130 indicates the skewed orientation of the video recording device. For example, if a user is holding the video recording device tilted to the right so that the bottom of the viewfinder area is not horizontal, then the cross will rotate to the right to indicate the skewed orientation. In an embodiment, the dotted cross is not displayed as part of the GUI and, in another embodiment, the dotted cross is displayed as part of the GUI to guide the user back to the desired orientation. Through the state changes shown in FIG. 2J, the user is encouraged to rotate the video recording device to realign the cross to the position indicated by the dotted cross returning the cross to the state shown in FIG. 2A.

Figure 2K:
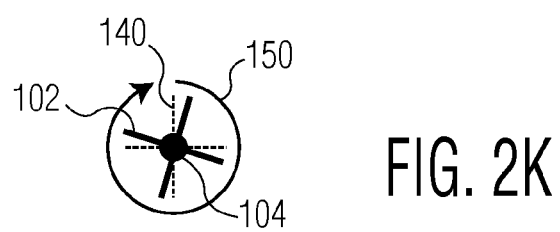
FIG. 2K is an illustration of the cross and indicator token in a state that provides further notification relating to orientation of the video recording device in accordance with an embodiment of the invention.

FIG. 2K depicts an embodiment of the cross 102 and indicator token 104 in a state that is configured to provide visual notification that the video recording device is held at a skewed orientation similar to FIG. 2J except that, in FIG. 2K, the cross continuously rotates once the video recording device has been rotated more than ninety degrees from horizontal as indicated by the circular solid arrow 150. The cross will continue to rotate until the device is returned to a more horizontal orientation (i.e., less than ninety degrees from horizontal), at which point the cross and indicator token assume the state shown in FIG. 2J. In an embodiment, the dotted cross is not displayed as part of the GUI and, in another embodiment, the dotted cross is displayed as part of the GUI to guide the user back to the desired orientation. In a further embodiment, the cross continuously rotates while the video recording device is in a portrait orientation and will continue to rotate until the video recording device is rotated back toward a landscape orientation (i.e., the long edge of the video viewfinder is less than ninety degrees from the horizontal). Through the state changes shown in FIG. 2K, the user is encouraged to rotate the video recording device back to the right or left accordingly to realign the cross with the dotted cross returning the cross to the state shown in FIG. 2J and, eventually, FIG. 2A as described in FIG. 2J above. For example, through the state changes shown in FIG. 2K, the user is encouraged to record with the video recording device in a landscape orientation as opposed to in a portrait orientation.

Figure 2L:
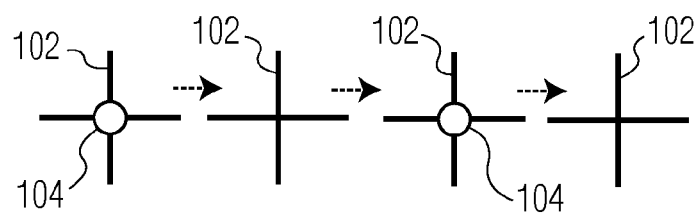
FIG. 2L depicts an embodiment of the indicator token in a time series of states that provide visual notification relating to the quality of the audio captured and/or the selected camera mode in accordance with an embodiment of the invention.

FIG. 2L depicts an embodiment of the cross 102 and indicator token 104 in a time series of states that represent the indicator token as blinking. The blinking indicator token provides visual notification that the captured audio is of poor quality and/or that the selected camera mode does not match with the detected recording conditions. As indicated by the white indicator token and alternating pattern shown in FIG. 2L, the indicator token has changed color (e.g., from black to white) and appears to blink to provide the desired visual notification. For example, when audio quality is poor, the indicator token may turn red and begin to blink. A text message can also be displayed below the cross and indicator token with more details on what sort of issue is occurring. For example, if a high burst of wind occurs during recording, then the indicator token turns red and begins blinking with the text "Wind Noise!" appearing beneath the cross. Through the state changes shown in FIG. 2L, the user is encouraged to reposition or redirect the video recording device until the audio issue is resolved and the cross and indicator token resume the state shown in FIG. 2A. Additionally, the indicator token can change to different colors to provide other visual notifications.

In another example, when the selected camera mode does not match with the detected recording conditions, the indicator token may turn white and begin to blink. An additional text message can be displayed below the cross and indicator token with more details on what camera mode should be selected. For example, if a mode configured for taking video at night is selected, but the sensors detect that the camera is under direct sunlight, then the indicator token may turn white and begin to blink with text such as "Change Camera Mode!" displayed beneath the cross and indicator token. In an embodiment, the indicator token will continue to blink and the text will continue to be displayed until the camera mode is changed. Through the state changes shown in FIG. 2L, the user is encouraged to change the mode of the camera to a mode more suitable for the detected recording conditions.

In addition to the above described states, the configuration of the cross and indicator token can assume transitional states when changing from one of the above states to another. These transitional states, as well as the above states, comply with several main principles for designing an efficient GUI. For example, each state, transitional or as described above, has a minimalist design such that the cross and indicator token occupy limited space on the viewfinder of the video recording device and keep user interaction low to avoid distracting the user from the scene being recorded. By conveying information to the user via animation, forms, colors, and shapes, low user interaction with the GUI is maintained because the notifications are quickly understood without the need for high reading comprehension or regard for the user's language or culture.

Keeping in mind the goals of minimalist design, low user interaction, and symbolic communication, the various states, either alone or in combination, are able to provide a wide range of visual notification to the user of a video recording device. In order to allow for the combination of various states, each state is configured using a limited set of shapes, forms, colors, and animations to convey certain visual notifications to the user.

By changing the various states of the cross and indicator token as described above with reference to FIGS. 2A-2L and encouraging the user to try to correct recording of the video content in order to return the cross and indicator token back to a neutral state, the GUI delivers the notifications in a manner similar to a video game. For example, as in a first-person shooter or fighter pilot game where a player strives for accuracy to earn points, the user of the GUI is similarly encouraged to strive for accuracy to reduce the number of visual notifications being displayed. In an embodiment, the visual notifications may be accompanied by a funny cartoon character or mascot that helps to identify the cause of the cross and indicator token state change. For example, a brand mascot, located in one corner of the video viewfinder or centrally located where appropriate (e.g., when the screen or microphone is blocked), can change with the state of the cross and indicator token or can reflect an emotion selected and/or felt by the user. Thus, not only does the GUI not render the features of the invention useless, the GUI helps make the use of the features fun for the user.

Although the indicator token is shown primarily as a circle, it could be any other geometric shape. Similarly, although the cross is described as formed from orthogonal lines in the above-provided examples, the lines can intersect at an angle that is not exactly orthogonal. For example, the lines can intersect within a range of 80-100, 85-95, or 88-92 degrees.

Figure 3:
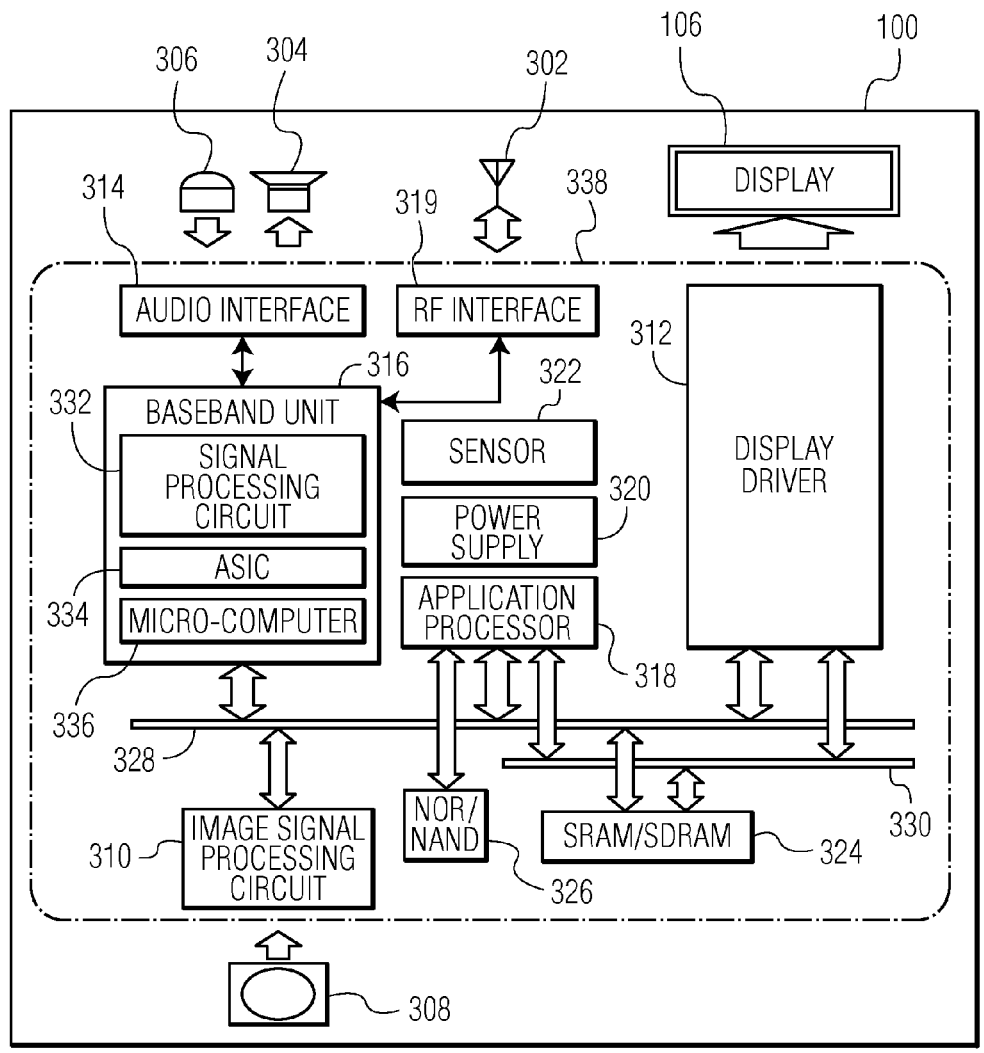
FIG. 3 is a block diagram of a video recording device.

FIG. 3 is a block diagram of a mobile phone 100 on which the above-described GUI may be displayed. The mobile phone includes a video viewfinder 106, a transmission/reception antenna 302, an audio output speaker 304, an audio input microphone 306, an image sensing element 308, an image signal processing circuit 310, a display driver 312 for driving the video viewfinder, an audio interface 314 for performing signal input/output operations to the speaker or the microphone, an RF interface 319 for performing signal input/output operations to the antenna, a baseband unit 316 for performing signal processing associated with an audio signal or a transmitted/received signal, an application processor 318 composed of a microprocessor having a multimedia processing function and a resolution adjustment function, a power supply 320, a sensor for sensing at least one environment condition 322, volatile memory 324, and non-volatile memory 326. The individual electronic components, including the baseband unit and the application processor, are mounted on a single or a plurality of mounting substrates 338. The application processor processes not only an image signal from the image sensing element, but also image data received from another device via the RF interface. The display driver, the baseband unit, the application processor, the volatile and/or non-volatile memory, and the image signal processing circuit are connected to allow data transfer there between by a system bus 328. In the mobile phone of FIG. 3, a display data bus 330 is provided in addition to the system bus. The display driver 312, the application processor 318, and the internal and/or external memory 324, 326 are connected to the display data bus 330. The baseband unit has a signal processing circuit 332, an ASIC (Application Specific Integrated Circuit) 334 for providing a custom function (user logic), and a microcomputer 336 as a system controller for controlling the system (e.g., generation of a baseband signal or display signal). The volatile memory 324 is typically composed of SRAM or SDRAM and used as a frame buffer for holding image data to which various image processing has been performed. The non-volatile memory 326 is typically composed of flash memory such as NOR or NAND flash memory and can be used to store video content (i.e., video and audio data) captured by the image sensing element. Although a mobile device is one example of a video recording device on which the above-described GUI can be displayed, the above-described GUI may also be displayed on other video recording devices such as, for example, a hand-held video camera, a point-and-shoot camera, a tablet computer, or any other portable, hand-held, or mobile device capable of capturing video content.

The above-described GUI may be implemented using software instructions stored on a computer useable storage medium for execution by a computer. For example, the software instructions may be stored in the non-volatile memory 326 of the mobile phone 100 of FIG. 3. In an embodiment, the GUI is realized through a computer useable storage medium for storing instructions that, when executed on a mobile device, causes the mobile device to perform operations, as described herein.

In an embodiment, a GUI control signal is generated through a process of capturing an image by the image sensor and/or receiving input signals from the various sensors, processing the image and/or input signals by the application processor, and outputting a GUI control signal to the display data bus. The display driver then receives the output and configures the cross and indicator token in the corresponding state on the display in response to the GUI control signal.

Figure 4:
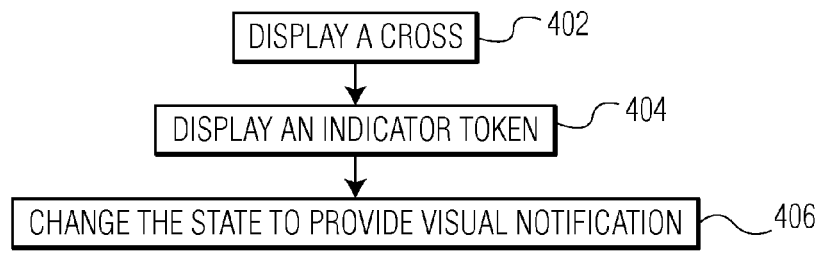
FIG. 4 is a flow chart of a method in accordance with an embodiment of the invention.

FIG. 4 is a process flow diagram of a method for assisting in recording video content on a video recording device. At block 402, a cross is displayed on the video viewfinder of the video recording device. At block 404, an indicator token is also displayed on the video viewfinder of the video recording device. At block 406, the cross and/or the indicator token change states to provide visual notification to the user of the video recording device.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Furthermore, embodiments of at least portions of the invention can take the form of a computer program product accessible from a non-transitory computer-usable or computer-readable medium providing program code for use by or in connection with a computer or any instruction execution system. For the purposes of this description, a non-transitory computer-usable or computer readable medium can be any apparatus that can store the program for use by or in connection with the instruction execution system, apparatus, or device. Examples of a non-transitory computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for assisting in recording video content on a video recording device, the method comprising:
   displaying a cross, the cross comprising two orthogonal intersecting lines; and
   displaying an indicator token;
   wherein at least one of the cross and the indicator token change state in response to a control signal from the video recording device to provide visual notification to a user of the video recording device;
   wherein the change of state comprises the indicator token changing at least one of its horizontal and vertical position relative to the cross to provide visual notification relating to at least one of focus and image stability; and
   wherein the cross and indicator token are displayed as a graphic overlay on a video viewfinder area.

2. The computer-implemented method of claim 1, wherein the change of state comprises the cross rotating around its center to provide visual notification relating to orientation of a video recording device.

3. The computer-implemented method of claim 1, wherein the change of state comprises the indicator token changing color to provide visual notification relating to at least one of light balance, audio quality, and camera mode.

4. The computer-implemented method of claim 1, wherein the change of state comprises the indicator token changing size to provide visual notification relating to at least one of zooming and repetitive animation.

5. The computer-implemented method of claim 1, wherein the change of state comprises the indicator token changing shape to provide visual notification relating to at least one of camera lens and microphone blockage.

6. The computer-implemented method of claim 1, wherein the change of state comprises the cross and indicator token changing state in response to changes in inertia experienced by the camera.

7. The computer-implemented method of claim 1, wherein the indicator token has a geometric shape.

8. The computer-implemented method of claim 1, wherein the cross and indicator token are accompanied by a text message related to the provided visual notification.

9. The computer-implemented method of claim 1, wherein the visual notification relates to a possible problem with the video content recording.

10. A system comprising a display device and a processor, wherein the processor is configured to execute instructions to display a graphical user interface on a video viewfinder of a video recording device, wherein the graphical user interface assists in recording video content, the graphical user interface comprising:
    a cross, the cross comprising two orthogonal intersecting lines; and
    an indicator token;
    wherein, at least one of the cross and the indicator token changes state in response to a control signal from the video recording device to provide visual notification to a user of the video recording device;
    wherein the change of state comprises the indicator token changing at least one of its horizontal and vertical position relative to the cross in response to changes in inertia experienced by the video recording device to provide visual notification relating to at least one of focus and image stability.

11. The system of claim 10, wherein the change of state comprises the indicator token changing geometric shape to provide visual notification relating to at least one of camera lens and microphone blockage.

12. The system of claim 10, wherein the change of state comprises the cross rotating around its center to provide visual notification relating to orientation of a video recording device.

13. The system of claim 10, wherein the change of state comprises the indicator token changing color to provide visual notification relating to at least one of light balance and audio quality.

14. A non-transitory computer-readable storage medium comprising instructions that, when executed in a video recording device, enable a graphical user interface to be displayed on a video viewfinder of the video recording device, wherein the graphical user interface assists in recording video content, the graphical user interface comprising:
    a cross, the cross comprising two orthogonal intersecting lines; and
    an indicator token;
    wherein, at least one of the cross and the indicator token changes state in response to a control signal from the video recording device to provide visual notification to a user of the video recording device;
    wherein the change of state comprises the indicator token changing at least one of its horizontal and vertical position relative to the cross in response to changes in inertia experienced by the video recording device to provide visual notification relating to at least one of focus and image stability.

15. The non-transitory computer-readable storage medium of claim 14, wherein the change of state comprises the indicator token changing geometric shape to provide visual notification relating to at least one of camera lens and microphone blockage.

16. The non-transitory computer-readable storage medium of claim 14, wherein the change of state comprises the cross rotating around its center to provide visual notification relating to orientation of a video recording device.

* * * * *